United States Patent [19]

Furlough

[11] Patent Number: 5,323,862

[45] Date of Patent: Jun. 28, 1994

[54] MOLDBOARD PLOW TRIP

[75] Inventor: Thomas D. Furlough, Tarboro, N.C.

[73] Assignee: Long Manufacturing N.C., Inc., Tarboro, N.C.

[21] Appl. No.: 909,679

[22] Filed: Jul. 7, 1992

Related U.S. Application Data

[63] Continuation-in-part of Ser. No. 726,962, Jul. 8, 1991, abandoned.

[51] Int. Cl.⁵ .................................................. A01B 61/04
[52] U.S. Cl. ..................................... 172/267; 172/705; 172/264
[58] Field of Search ................. 172/261, 264–270, 172/233, 683, 763, 705, 710; 403/93, 95, 328, DIG. 6

[56] References Cited

U.S. PATENT DOCUMENTS

| 234,090 | 11/1880 | Thomas | 403/93 |
|---------|---------|--------|--------|
| 274,962 | 4/1883 | Nutting | 172/265 |
| 2,109,385 | 2/1938 | Garrison et al. | 172/267 |
| 2,565,668 | 8/1952 | Simpson . | |
| 2,863,372 | 12/1958 | Bergerson . | |
| 2,947,368 | 8/1960 | Jadoul | 172/264 |
| 3,312,408 | 1/1962 | Hansen | 172/263 |
| 3,321,027 | 5/1967 | Johnson et al. | 172/267 |
| 3,662,839 | 5/1972 | Thorsrud et al. | 172/266 |
| 3,910,354 | 10/1975 | Johnson et al. | 172/267 |
| 3,972,374 | 8/1976 | Venable et al. | 172/261 |
| 3,976,144 | 8/1976 | Ralston et al. | 172/267 |
| 4,054,177 | 10/1977 | Quanbeck | 172/267 |
| 4,128,130 | 12/1978 | Green et al. | 172/266 |
| 4,312,407 | 1/1982 | Crosby | 172/261 |
| 4,363,363 | 12/1982 | Dyck | 172/264 |
| 4,609,051 | 9/1986 | Good | 172/266 |
| 4,881,776 | 11/1989 | Wang | 403/93 |
| 5,011,324 | 4/1991 | Putney | 403/308 |
| 5,024,281 | 6/1991 | Furlough | 172/219 |
| 5,197,552 | 3/1993 | Di Maria | 172/261 |

Primary Examiner—Randolph A. Reese
Assistant Examiner—Spencer Warnick
Attorney, Agent, or Firm—Dowell & Dowell

[57] ABSTRACT

A moldboard support is pivotally hinged to its carrier and has a medial rearward portion pivotally connected to a lower link, the upper portion of the link having an arcuate ramp with a portion engaging a detent mounted in an upper link that is pivotally connected to the lower link at its lower end portion and to the carrier at its upper end. The support and two links form a toggle in which the pivot pin connecting the two links is normally slightly rearward of a line connecting their upper and lower pivot pins and that permits the support to pivot rearwardly and upwardly when an obstruction is met and to return by gravity when the carrier is raised. The operating angular position of the support may be changed by shifting the pivot pin for the upper link.

A tension spring is mounted to exert an initial resetting force on the moldboard support in its upper tripped position to assist in breaking away from impacting materials.

15 Claims, 3 Drawing Sheets

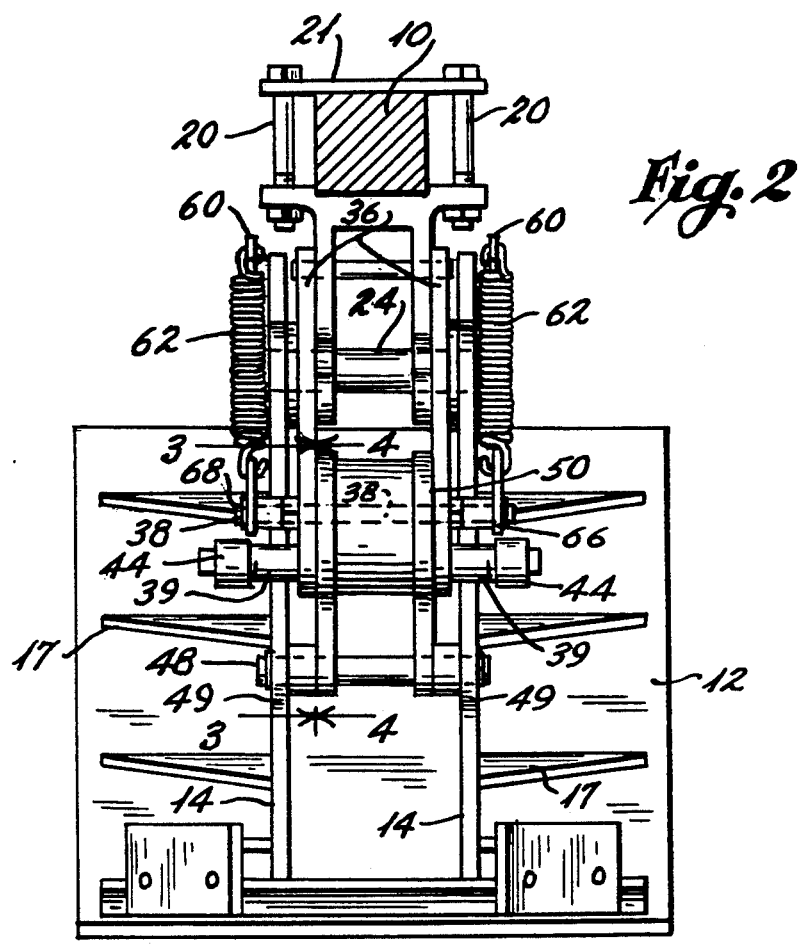
Fig. 2
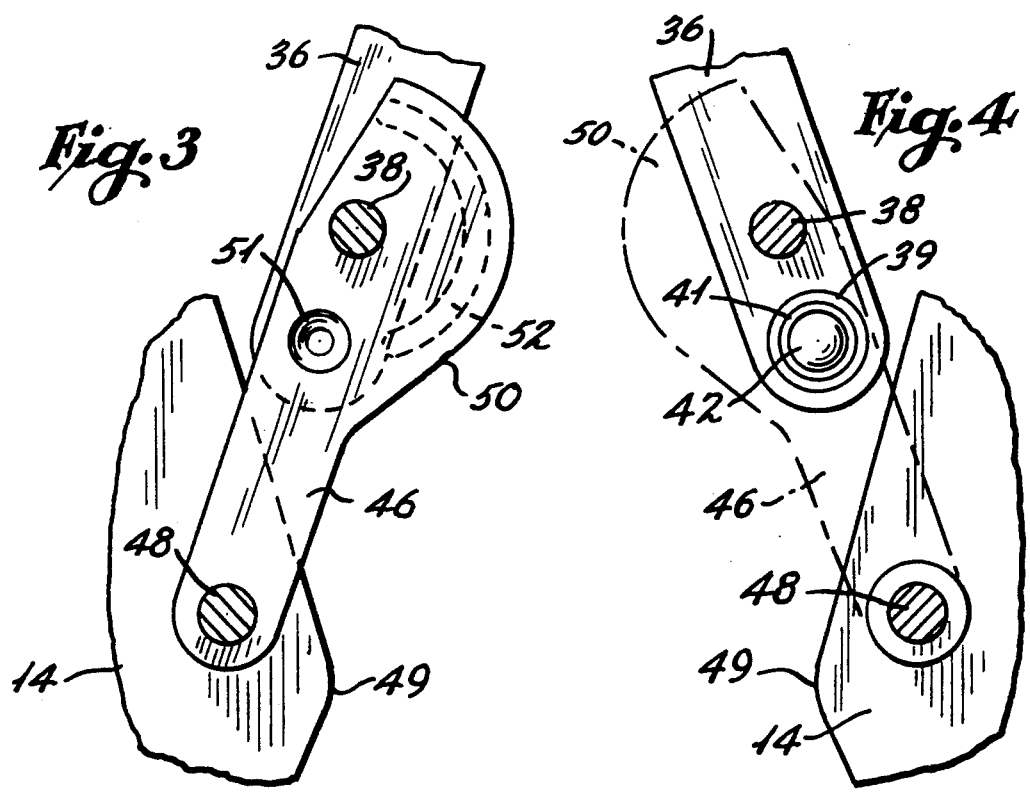
Fig. 3
Fig. 4

MOLDBOARD PLOW TRIP

Cross-Reference to Related Applications

This application is a continuation-in-part of application Ser. No. 07/726,962 filed Jul. 8, 1991 now abandoned.

BACKGROUND OF THE INVENTION

1. Field of the Invention

This invention relates to moldboard plow supports and more particularly to a support which trips when an obstruction or excessive resistance to movement of the blade is encountered in order to avoid damage to the plow structure.

2. Description of the Related Art

Various kinds of plow trips have been used heretofore. One type has employed a toggle linkage and a heavy spring which biases the toggle toward the closed operating position. Such arrangements employ a spring viewed as sufficiently strong to return the plow to its operating position as soon as the obstruction is passed. An example is shown in the patents to Simpson 2,565,668, Ralston et al. 3,976,144, and Good 4,609,051 (spring plus gravity return). Another type has the links in an off-center relationship so that when an obstruction is encountered the center linkage passes through dead center. A spring is provided to tend to urge the links in the off-center relationship. An example of such patents is Johnson et al. 3,910,354 and Crosby 4,312,407.

The patent to Bergerson 2,863,372, discloses a spring biased detent which engages a slide member and normally holds the plow in plowing position but which permits it to lift to the rear when an obstruction is encountered.

Green et al. 4,128,130, discloses a biased four bar linkage which permits the tool to pass over obstacles that are encountered but which restores the tool to earth penetrating position after it has been tripped.

The patent to Venable et al. 3,972,374, discloses a linkage mechanism including a spring biased linkage mechanism and a pivot riding in an enlarged opening tending to hold the links extended, the arrangement permitting tripping of the plow after which the operator raises the main frame in order to permit the weight of the apparatus to return the linkage to normal position.

SUMMARY OF THE INVENTION

The present invention is embodied in a plowshank trip which has a main support member connected to a fixed pivot providing the primary support for the moldboard. The moldboard support member has a knee portion to which is attached the lower end of a lower link member which has an extended ramp portion at its upper end which receives a pivot pin connected to an upper link the upper end of which is pivotally connected rearwardly of the fixed pivot to the support member. A laterally positioned resilient detent extends through the side of the lower end portion of the upper link and engages a slot in the upper end portion of the lower link when the links are approximately 5° out of alignment. The slot for engaging the detent positions the links in position for ordinary plowing. When an obstruction is encountered the detent moves out of the slot but is maintained in contact with the ramp portion of the lower link. The enlarged ramp structure of the lower link facilitates assembly and maintenance of position of the parts. A tension spring is mounted to assist the initial resetting movement of the main support member.

In order to provide an adjustable angular relationship for the moldboard plow the upper end of the upper link may be connected at varying positions to the support member.

BRIEF DESCRIPTION OF THE DRAWINGS

FIG. 2 is a rear elevation of a moldboard assembly;

FIGS. 3—3 and 4—4 are enlarged sections on the lines 3—3 and 4—4 of FIG. 2, illustrating the upper and lower links.

DESCRIPTION OF THE PREFERRED EMBODIMENT

Figure 1:
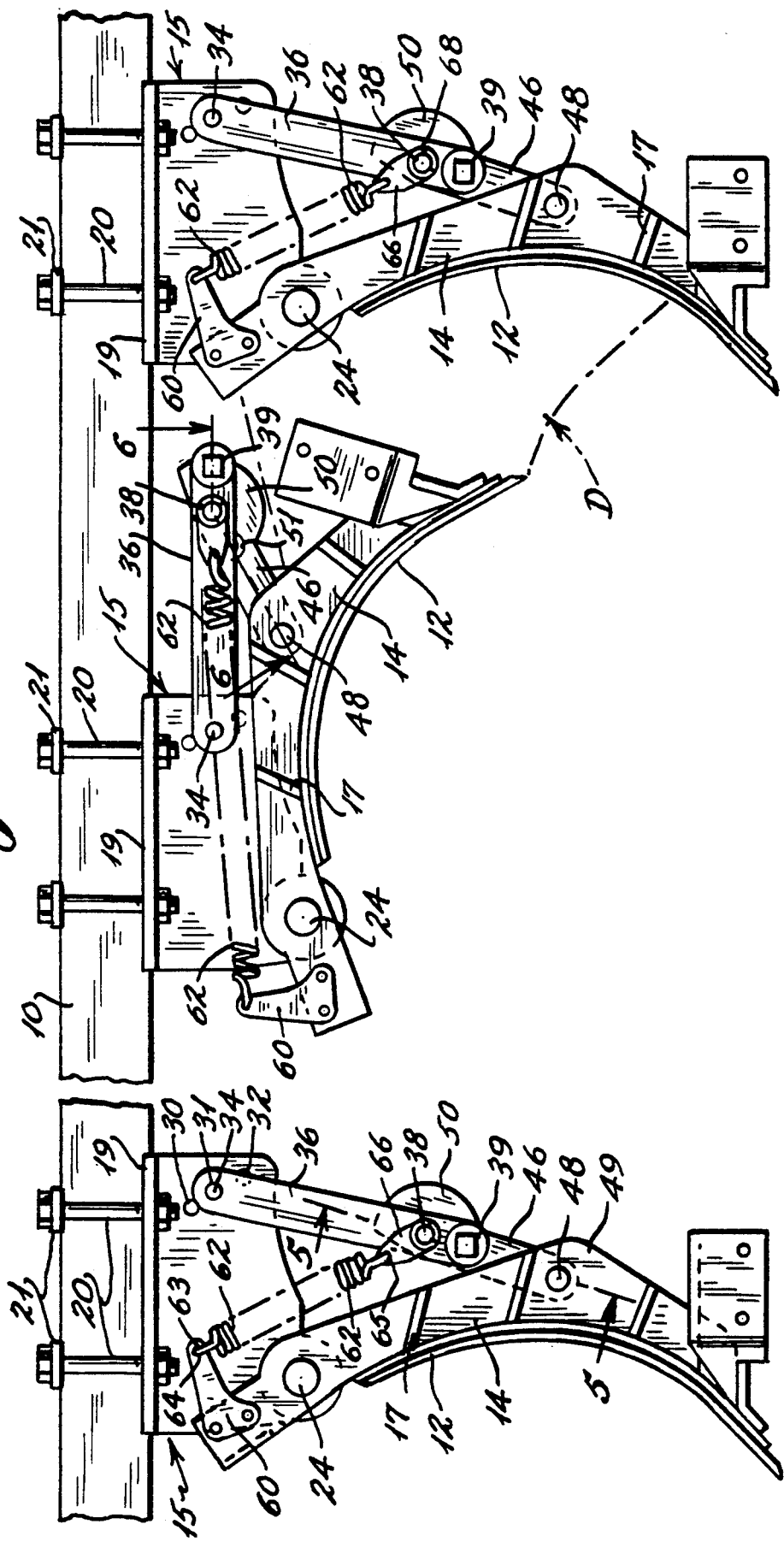
FIG. 1 is a side elevation of three moldboard assemblies on a carrier beam, the central plowshank being in tripped position.

With further reference to the drawings, a longitudinal carrier or beam support member 10 is illustrated which may be of the type shown in my U.S. Pat. No. 5,024,281 entitled "REVERSIBLE MOLDBOARD PLOW", and there designated by the numbers 40 and 41 for carrying a series of spaced moldboards. The longitudinal beam is connected to a three point hitch which may be raised and lowered by suitable means associated with a conventional tractor, not shown.

At spaced longitudinal intervals the carrier beam 10 has a series of moldboards 12 which are mounted on support shanks 14 braced by gussets 17 and pivotally mounted on support bracket 15 of the carrier beam. The bracket has spaced side members 16 that are connected by struts. The upper edge of the bracket has a ledge 19 on each side that receives fastening members 20 that extend through plates 21 that span the top of the beam 10 in order to support the bracket.

The bracket has a forward lower portion carrying a pin 24 that provides a fixed pivot for the upper end of the moldboard support shank 14.

At its upper rearward portion the bracket 15 has a series of openings 30, 31, and 32 which provide selective supports for pin 34 that carries the upper end of upper (paired) link 36 of a toggle linkage. The upper link 36 receives a pivot pin 38 in its lower portion and rigidly carries a laterally extending tube 39 for a compression spring 40, spaced below the pin 38. The inner end of the compression spring engages a ball support 41 for a ball 42 that is slidable in the tube 39. The compressive tension on the spring 40 may be adjusted by a cap 44 that is threadedly engaged with the outer end of the tube 39, and also by a shim 45. The pivot pin 38 connects the upper link 36 to a lower (paired) link 46 having a lower end mounted by a pin 48 in the knee portion 49 of the support shank 14.

Figure 5:
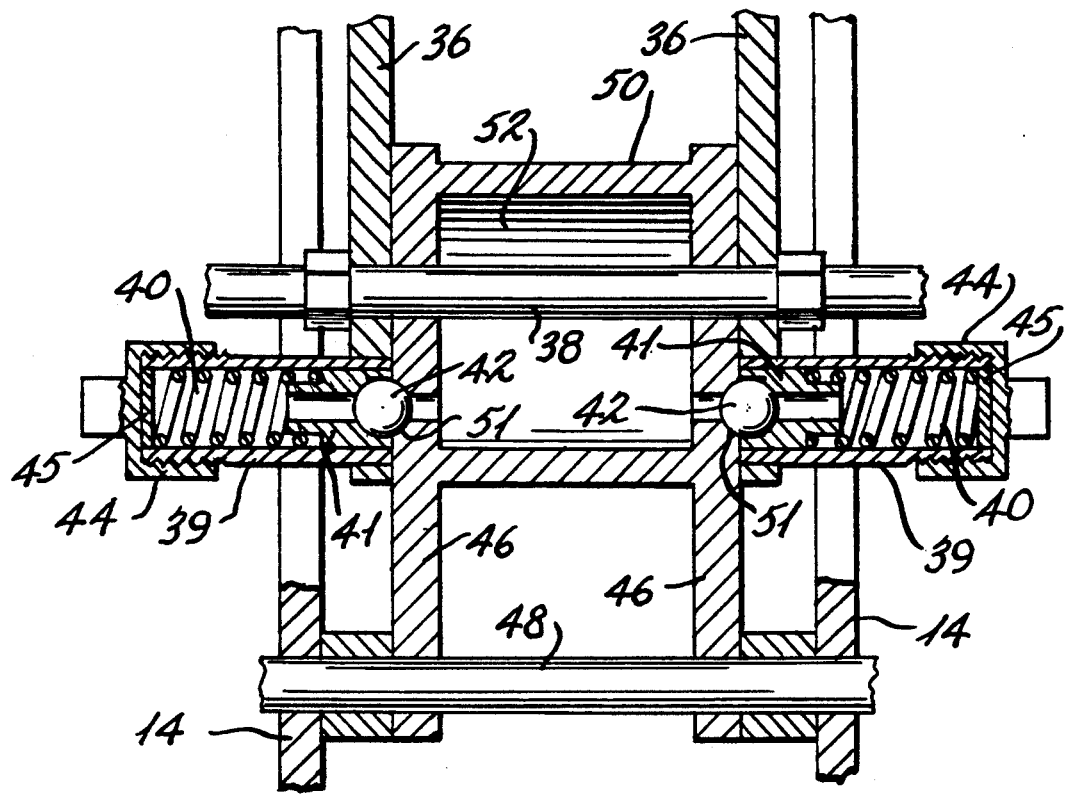
FIGS. 5—5 and 6—6 are enlarged sections on the lines 5—5 and 6—6 of FIG. 1.
Figure 6:
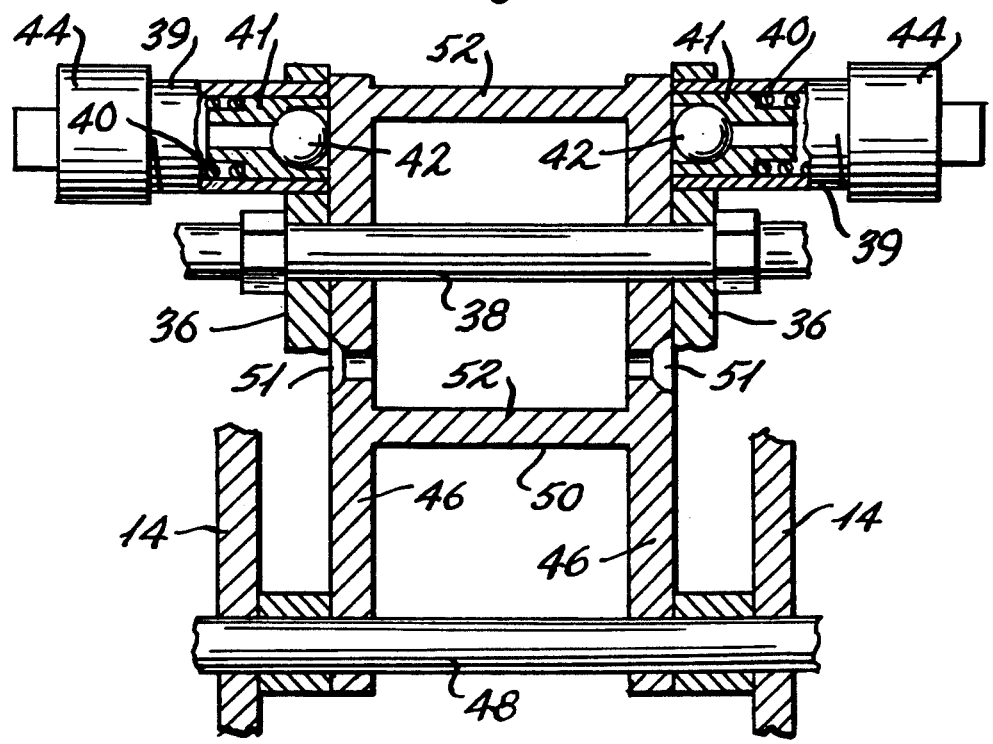

The lower link 46 has an upper portion forming an extended ramp portion 50 that receives the pivot pin 38. The ramp portion 50 has a slot or depression 51 (see FIG. 5) which receives the ball 42 that is carried by the upper link 36. The ramp portion 50 is of arcuate nature in order that when the ball is disengaged from the slot 51 it will engage the extended portion of the ramp 50, as indicated in FIG. 6. The two side ramps 50 are connected by a bridge 52, as shown in FIGS. 2, 5 and 6.

The position of the fixed pivots 24 and 34 and the effective length of the support shank 14 and of the upper and lower links 36 and 46 and the position of the pivot pin 38 is such that in the lowermost extended position, as indicated in FIG. 1, the links 36 and 46 are approximately 5° from extending in a straight line. Thus, no stop means is required to prevent the mechanism from moving across center in the opposite direction.

In the operation of the device the substantial alignment of the upper and lower links 36 and 46 permits the use of a relatively small force such as that provided by the ball or detent 42 engaging the slot 51 in the lower link in order to maintain the moldboard in its operative position. When an obstruction or an unusual resistance of predetermined amount is encountered the ball or detent 42 rides out of the slot 51 and onto the outer surface of the ramp portion 50 of the lower link as the links move outwardly to a position, as indicated with the central plowshank in FIGS. 1 and 6, in which the moldboard is elevated above the surface of the earth. Since there is no resistance to the upper movement of the moldboard other than the force of gravity, it is moved upward easily and tends to float over the earth. After the obstruction is passed, the operator merely raises the three point hitch which carries the beam 10 in order to permit the moldboard to return by gravity to its customary operating position.

In the event that the operator desires to change the angle of the moldboard with respect to the earth he may do this by shifting the pin 34 between any of the openings 30, 31 or 32.

The use of the spring pressed ball detent avoids the necessity for the use of a heavy coil spring as is frequently used, thus providing a relatively simple and inexpensive arrangement of parts. Furthermore, the detent arrangement provides for an easily set and maintained trip that is responsive to a predetermined impacting force on the plowshank, and that once tripped, permits the plowshank to swing easily to a raised position.

Since nearly all of the assembly is positioned rearwardly of the pivot pin 24, when the assembly is raised to pass over an obstacle its center of gravity is rearward of the pivot so that it tends to return to its former position.

However, in some types of soil, especially clay, a clump of dirt D may tend to become packed between a raised plowshank and the next rearward plowshank as indicated in FIG. 1. This may impede or prevent the gravity return of the plowshank to its normal operating position. In order to overcome this occasional problem, the present invention provides for a reset spring to assist the plowshank in breaking away from any materials that become packed between adjacent plows.

The reset spring assembly includes a paired arm 60 mounted at the upper end of the support shank 14 above the pivot pin 24. The arm extends outwardly from a line passing through the axes of pins 24 and 38 in order to provide a lever arm around pin 24 for the resetting function. A spring 62 has an upper end 63 connected to the outer end 64 of arm 60. The other end 65 of the spring is connected to a link 66 having an opening to receive the outer end of the pin 38. A conventional C clip 68 may be used to retain the link 66 on the pin 38.

When the plowshank is tripped to an upper position a indicated centrally in FIG. 1, the spring 62 is placed under tension and pulls on the arm 60, thereby assisting in initial breaking away of the plowshank from the impacted materials in order that the built-in gravity return may restore the plowshank to operating position.

I claim:

1. A moldboard assembly for a plow having longitudinal carrier means, comprising, support means, a moldboard having a blade with a lower edge, said moldboard mounted on said support means, said support means mounted on said carrier means by a main support pivot, linkage means connecting the carrier means and a point on the support means between the pivot and the lower edge of the blade, said linkage means including a lower link having its lower end connected by a first pivot to said point, an upper link pivotally connected by a second pivot to the carrier means rearwardly of the first pivot, a third pivot connecting the upper link to said lower link detent means including a ball carried by one link cooperating with a recessed detent engaging means carried by the other link, in an operative position of the moldboard said detent engaging means being so positioned that when the upper and lower links are at an angle slightly less than 180°, said third pivot lies outwardly of a line connecting the first and second pivots, said detent means then being engaged by said engaging means, said detent means being disengaged from said engaging means when said moldboard encounters a greater than predetermined resistance in its forward movement to permit said moldboard to pivot rearwardly as said upper and lower links move from an extended to a smaller angular relationship, and whereby, after the plow moves past the resistance the carrier means may be lifted to raise the moldboard blade above the earth to permit the moldboard to drop by gravity to its operative position.

2. A moldboard assembly in accordance with claim 1, in which the detent means is mounted on the lower portion of the upper link and the detent engaging means is mounted on the lower link.

3. The assembly of claim 2, said lower link having an upper portion with an extended ramp portion, and said detent means rides over the ramp portion of said lower link to permit said moldboard to pivot rearwardly.

4. The assembly of claim 1, and means resiliently urging said ball of said detent means against the detent engaging means.

5. The assembly of claim 4, and means for adjusting the position of said second pivot to change the angle of the moldboard.

6. A moldboard assembly as in claim 1, said support means having an outwardly extending arm above the main support pivot, tension means extending between the arm and said linkage means, said tension means assisting in the initial return of said moldboard from a raised to a lower position.

7. A moldboard assembly as in claim 6, in which the tension means is connected to the linkage means at the third pivot.

8. A moldboard assembly as in claim 6, in which the tension means is a coil spring.

9. A moldboard assembly for a plow having longitudinal carrier means, comprising, support means, a moldboard having a blade with a lower edge, said moldboard mounted on said support means, said support means mounted on said carrier means by a main support pivot, linkage means connecting the carrier means and a point on the support means between the pivot and the lower edge of the blade, said linkage means including a lower link having its lower end connected by a first pivot to said point, an upper link pivotally connected by a second pivot to the carrier means rearwardly of the first pivot, a third pivot connecting the upper link to said lower link, detent means mounted on a lower portion of the upper link cooperating with detent engaging means mounted on the lower link, in an operative position of the moldboard said detent engaging means being so positioned that when the upper and lower links are at an angle slightly less than 180°, said third pivot lies outwardly of a line connecting the first and second pivots, said detent means then being engaged by said engaging means, said detent means being disengaged from said engaging means when said moldboard encounters a greater than predetermined resistance in its forward movement to permit said moldboard to pivot rearwardly as said upper and lower links move from an extended to a smaller angular relationship, said lower link having an upper portion with an extended ramp portion, said detent means riding over said ramp portion of said lower link to permit said moldboard to pivot rearwardly, and whereby, after the plow moves past the resistance the carrier means may be lifted to raise the moldboard blade above the earth to permit the moldboard to drop by gravity to its operative position.

10. The moldboard assembly of claim 9, and means resiliently urging said detent means against the detent engaging means.

11. The moldboard assembly of claim 10, and means for adjusting the position of said second pivot to change the angle of the moldboard.

12. The moldboard assembly of claim 11, said support means having an outwardly extending arm above the main support pivot, tension means extending between the arm and said linkage means, said tension means assisting in the initial return of said moldboard from a raised to a lower position.

13. The moldboard assembly of claim 12, in which the tension means is connected to the linkage means at the third pivot.

14. The moldboard assembly of claim 13, in which the tension means is a coil spring.

15. The moldboard assembly of claim 13, in which said detent means is a ball and said detent engaging means is a depression.

* * * * *